United States Patent
Muschallik et al.

(10) Patent No.: US 7,920,462 B2
(45) Date of Patent: Apr. 5, 2011

(54) AMPLITUDE ATTENUATION ESTIMATION AND RECOVERY SYSTEMS FOR OFDM SIGNAL USED IN COMMUNICATION SYSTEMS

(75) Inventors: Claus Muschallik, Singapore (SG); Yun Ye, Singapore (SG); Jien Mei Loh, Singapore (SG); Tee Yong Neo, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 527 days.

(21) Appl. No.: 11/865,393

(22) Filed: Oct. 1, 2007

(65) Prior Publication Data
US 2009/0086618 A1    Apr. 2, 2009

(51) Int. Cl.
*H04J 11/00* (2006.01)

(52) U.S. Cl. .................. 370/210; 370/203; 370/252

(58) Field of Classification Search .......... 370/203–211, 370/250–253, 431, 329, 481
See application file for complete search history.

(56) References Cited

U.S. PATENT DOCUMENTS

| | | | | |
|---|---|---|---|---|
| 5,604,768 | A * | 2/1997 | Fulton | 375/220 |
| 7,313,086 | B2 * | 12/2007 | Aizawa | 370/208 |
| 7,327,303 | B1 * | 2/2008 | Halsey et al. | 342/20 |
| 7,397,758 | B1 * | 7/2008 | Hart et al. | 370/208 |
| 2006/0023800 | A1 * | 2/2006 | Okada | 375/260 |
| 2007/0288832 | A1 * | 12/2007 | Adachi | 714/780 |
| 2008/0232483 | A1 * | 9/2008 | Yang et al. | 375/260 |
| 2008/0232518 | A1 * | 9/2008 | Kim et al. | 375/260 |
| 2010/0150000 | A1 * | 6/2010 | Sakata | 370/252 |

\* cited by examiner

*Primary Examiner* — Phuc Tran
(74) *Attorney, Agent, or Firm* — Lee & Hayes, PLLC

(57) ABSTRACT

This disclosure relates to amplitude correction for orthogonal frequency division multiplexing signals received by a communication device. An amplitude attenuation estimation is performed for amplitude correction on received OFDM signals.

17 Claims, 14 Drawing Sheets

US 7,920,462 B2

AMPLITUDE ATTENUATION ESTIMATION AND RECOVERY SYSTEMS FOR OFDM SIGNAL USED IN COMMUNICATION SYSTEMS

BACKGROUND

Orthogonal frequency division multiplexing or OFDM is a technique adopted in many communication systems, such as WiFi, digital audio broadcasting (DAB) and digital video broadcasting (DVB), including terrestrial (DVB-T) and handheld (DVB-H). OFDM has advantages over other techniques, advantages that include robustness against frequency selective fading and inter-symbol interference (ISI) caused by multi-path effect. OFDM techniques are particularly suited to support mobile channel communication, because OFDM techniques are able to address many problems related to mobile channels, problems that include linear distortions common in a mobile transmission, for example fading effects due to changes in antenna orientation or effects on the antenna such as placing an object (i.e., shadow) on the antenna.

A transmitted OFDM signal is sensitive to frequency errors which can introduce inter-carrier interference (ICI) leading to degraded receiver or device performance (i.e., the receiver or device misinterprets a received OFDM signal, since the original transmitted signal has been affected). In particular, an amplitude attenuation in OFDM signals causes ICI as well, resulting in misinterpreted received OFDM signals.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Disclosed herein are techniques for to correct for amplitude attenuation effects in OFDM signals used in communication systems. In one described implementation, a device receives a RF signal through one or more antennae, the RF signal representing an OFDM signal. A radio frequency end tuner receives the OFDM signal from the antennae, and an amplitude attenuation estimation performs amplitude correction on the received OFDM signals.

The techniques described herein may be implemented in a number of ways. One example environment and context is provided below with reference to the included figures and on going discussion.

Overview

In typical implementations, changes in signal amplitude can be compensated for by an automatic gain control (AGC) unit in a device implementing OFDM. Signal amplitude variations are slow compared to symbol duration or $T_S$ (i.e., symbol period). Therefore, the time constant of the AGC unit or $T_{AGC}$, is much greater than $T_S$ (i.e., $T_{AGC} \gg T_S$). It follows that when amplitude changes are in the range of a symbol period or $T_S$, the AGC unit is not able to follow the fast changes and a linear distortion occurs (i.e., change in amplitude and phase).

In order to address amplitude attenuation occurring within a symbol of an OFDM signal (i.e., $T_S$) estimation and compensation systems for amplitude attenuation may be implemented. The amplitude attenuation causes an inter-carrier interference (ICI) effect in an OFDM signal. Therefore, estimation mechanisms may be implemented to reduce the ICI by correcting signal amplitude in a demodulator system.

Due to the movement of a receiver (e.g., mobile device) or change of surrounding environment (e.g., moving cars, houses, trees, directions of streets, irregular terrain, etc.), the amplitude of the received OFDM signal is time varying. If variations are faster than the symbol rate ($1/T_S$), the amplitude distortion can not be compensated by an AGC unit, and a nonlinear distortion is obtained of the OFDM symbol. This variation is seen as amplitude attenuation. An ideal OFDM signal can be demodulated using a square (i.e., rectangular or constant amplitude) window. Amplitude attenuation or distortion has a similar effect as using a non-square window. This effect results in "leakage" in frequency domain, which is recognized as a source of ICI.

As discussed above, in typical OFDM implementations, the attenuation variation is not as fast as the OFDM symbol duration. Therefore in an implementation, amplitude attenuation within one OFDM symbol duration (i.e., $T_S$), is estimated and equalized, using methods and statistical information of a very fast attenuated signal.

Exemplary Device

Figure 1:
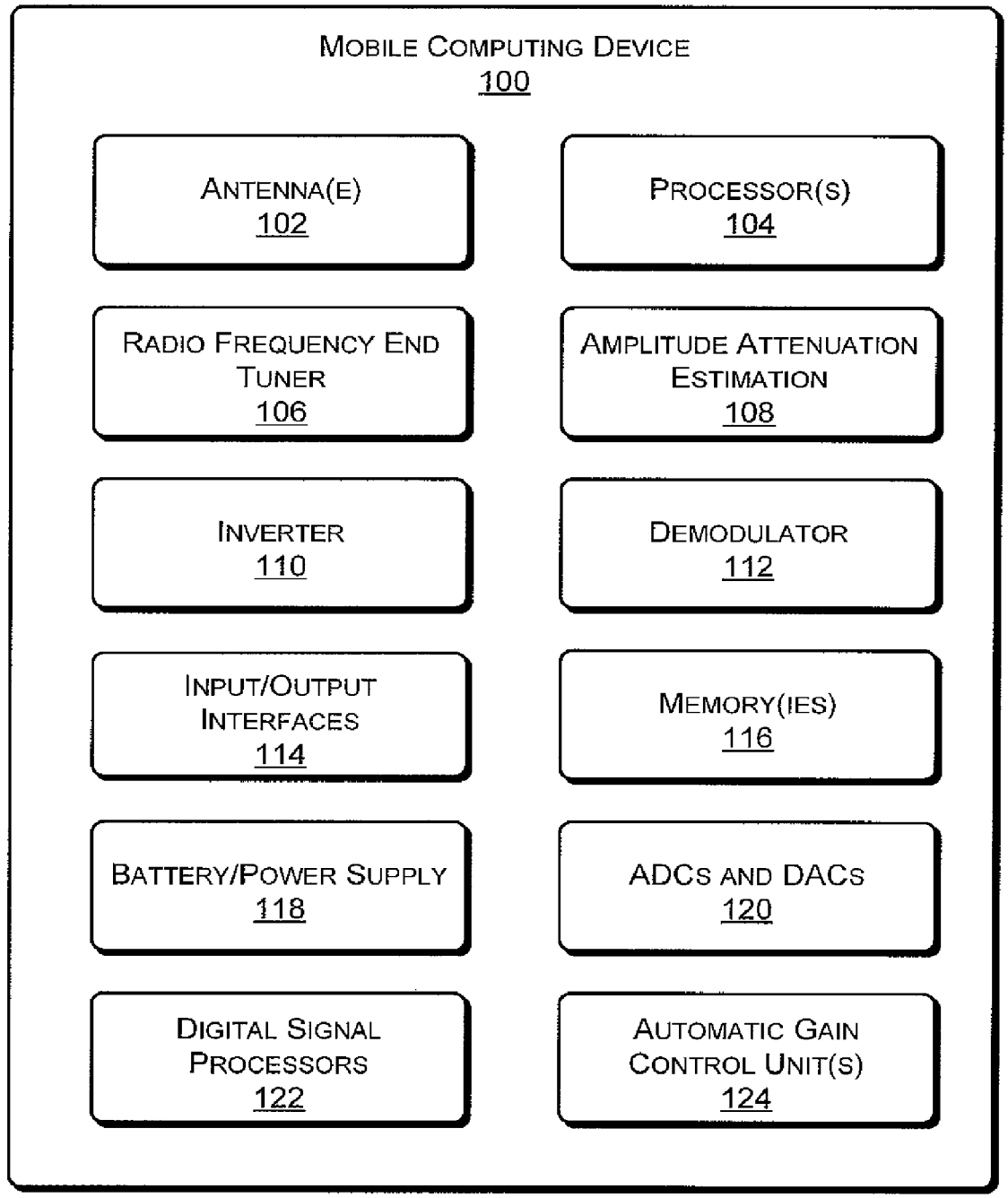
FIG. 1 is a block diagram illustrating an implementation of a device implementing amplitude attenuation correction.

FIG. 1 illustrates an implementation of an apparatus or device 100 implementing amplitude attenuation correction. The device 100 may be a mobile communication device. Device 100 includes one or more antennae 102 for transmitting and receiving radio frequency, and particularly receiving OFDM signals. The antennae 102 may be configured to received different radio frequency (RF) in different bands. One or more processors 104 perform control and command functions, including accessing and controlling the components of the device 100. A radio frequency end tuner 106 receives OFDM signals from the antennae 102. Particular functions of the radio frequency end tuner 106 are further discussed below. An amplitude attenuation estimation module 108 performs amplitude correction on received OFDM signals. The amplitude attenuation estimation module 108 also is further discussed below. An inverter 110 inverts the estimated amplitude attenuation from module 108. A demodulator 112 is used to separate the information from a carrier wave signal of the processed OFDM signal. The signal from the demodulator 112 may then be processed (i.e., used) by other components of the device 100.

Device 100 can further include input/output interfaces 114 such as a microphone, a user screen, a user interface (e.g., keypad, touchpad, etc.), speakers, and so on. One or more memories 116 provide various storage functions, including storing executable instructions (e.g., an operating system). The memories 116 can include read only memory, random access memory, flash memory, etc. Analog to digital converters (ADC) and digital to analog converters (DAC) are represented by ADCs and DACs 120. An ADC is used to convert analog signals (such as received RF signals) to digital signals, while a DAC translates digital signals to analog signals. Digital signal processors 122 include functions such as compressing and decompressing signals sent and received by the device 100. Furthermore, the device 100 includes an automatic gain control (AGC) unit 124 whose functions are described below.

Figure 2:
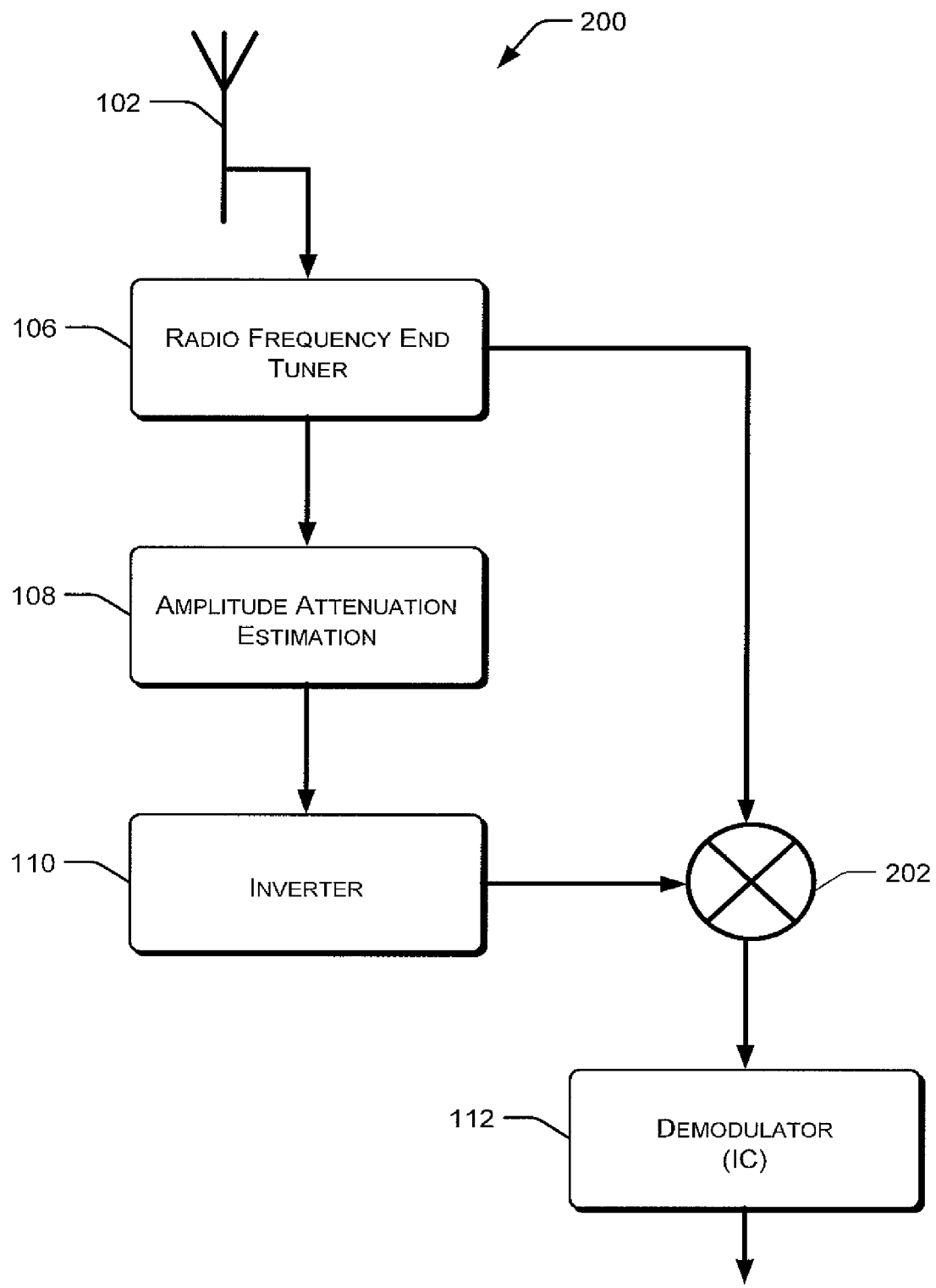
FIG. 2 is a block diagram illustrating an implementation of amplitude attenuation correction.

FIG. 2 illustrates a generalized block diagram 200 implementing amplitude attenuation correction. An OFDM signal in the form of an RF signal is received by one or more antennae 102. The received OFDM signal may or may not have been affected by ICI. The OFDM signal is converted to a baseband signal by the radio frequency end tuner 106. The signal from the radio frequency end tuner 106 may be a baseband intermediate frequency (IF) signal, including a low IF or zero IF signal. An amplitude attenuation signal is estimated (as further discussed below) by the amplitude attenuation estimation module 108. The inverter 110 creates inverse attenuation values which are combined (multiplied) with the original baseband signal by mixer 202. The demodulator 112 recovers the original transmitted OFDM signal (i.e., information in the OFDM signal). In certain implementations, amplitude attenuation in an AGC unit (e.g., AGC unit 124), may also be addressed by this particular technique.

Sources of Time Variant Amplitude Distortions

There are several possible sources of time variant amplitude distortions. Differentiation is made as to one-signal distortion and multi-signal distortion. An example of one-signal distortion is amplitude attenuation caused by an AGC amplifier or unit (e.g., AGC unit 124) which controls the gain of a single signal. An example of multi-signal distortion is fading which causes amplitude distortions originating due to the addition of a main path signal and same signals with different delays, amplitudes, and phases resulting in different effect. Effects due to multi-signal distortions can be corrected by using different mechanisms than effects due to one-signal distortion. Therefore in an implementation, a fading detector (as further discussed below) may be used to identify whether fading is affecting the OFDM signal. Appropriate measures (i.e., algorithms) as described below may be implemented, depending the distortion is one-signal or multi-signal.

Exemplary OFDM Signals

As an example, the estimation systems and recovery techniques are discussed in the context of digital video broadcasting-terrestrial (DVB-T) and digital video broadcasting-handheld (DVB-H) devices and integrated circuits (IC); however, it is to be appreciated that other technologies and devices implementing OFDM may make use of the described systems and techniques (e.g., WLAN, DAB, T-DMB, MediaFlo, WiFi, etc.).

An example of implementation of OFDM signals is a digital TV standard expressed as a DVB-T/H signal. Per the standard ETSI EN 300 744, one frame of a DVB-T/H signal is made of 68 OFDM symbols. One super frame is made up of four frames. A DVB-T/H signal, s(t), can be expressed by the following equation:

$$s(t) = \text{Re}\left\{ e^{j2\pi f_c t} \sum_{m=0}^{\infty} \sum_{l=0}^{67} \sum_{k=K_{min}}^{k=K_{max}} c_{m,j,k} e^{j2\pi k'(t-\Delta-l\cdot T_S - 68\cdot m\cdot T_S)/T_C} \right\}$$

With $(1+68\cdot m)\cdot T_S \leq t \leq (1+68\cdot m+1)\cdot T_S$ and $k'=k-(J=K_{max}+K_{min})/2$, where k denotes a carrier number, l denotes an OFDM symbol number, and m denotes a frame number. One OFDM symbol for a period from t=0 to $t=T_S$ may be expressed by the following equation:

$$s(t) = \text{Re}\left\{ e^{j2\pi f_c t} \sum_{k=K_{min}}^{k=K_{max}} c_{m,j,k} e^{j2\pi k'(t-\Delta)/T_C} \right\}$$

Where $C_{0,0,k}$ denotes a quadrature amplitude modulation (QAM) complex symbol for carrier k of data symbol number 1 in frame number 0. $\Delta$ is the length of guard interval.

After being demodulated in a baseband component such as radio frequency end tuner 106, the following signal is obtained, as represented by the following equation:

$$\hat{s}(t) = \text{Re}\left\{ \sum_{k=K_{min}}^{k=K_{max}} c_{0,0,k} e^{j2\pi k' t/T_C} \right\}$$

The attenuation signal is represented as a(t), and the received signal is represented by the following equation:

$$\hat{s}(t) = a(t)\text{Re}\left\{ \sum_{k=K_{min}}^{k=K_{max}} c_{0,0,k} e^{j2\pi k' t/T_C} \right\}$$

The received signal may be converted to an in-phase (i.e., real) or "I" part, and a quadrature (i.e., imaginary) or "Q" part before being processed in demodulator component or IC (e.g., demodulator 112).

Figure 3A:
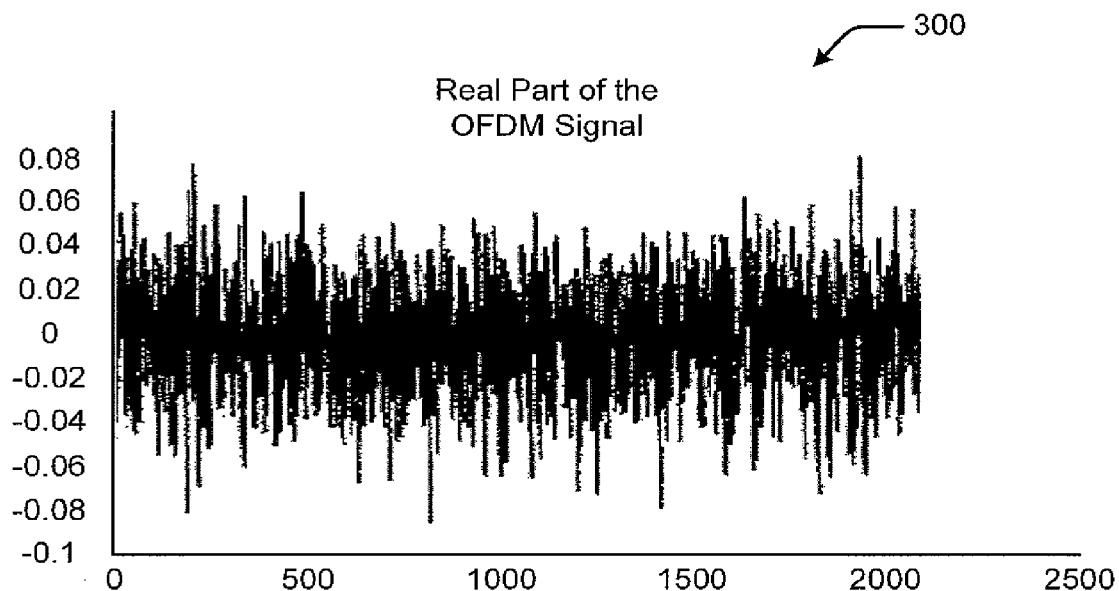
FIG. 3(A) is graph illustrating an OFDM signal at a tuner output without amplitude attenuation for a 2K system.

FIG. 3(A) illustrates an OFDM signal at a tuner (e.g., radio frequency end tuner 106) output without amplitude attenuation for a 2K system (i.e., 2K or 2048 samples are taken). In particular, the real part of the OFDM signal is plotted, with x-axis representing the number of samples and the y-axis representing amplitude values. In total, 2048 samples are shown in graph 300.

Figure 3B:
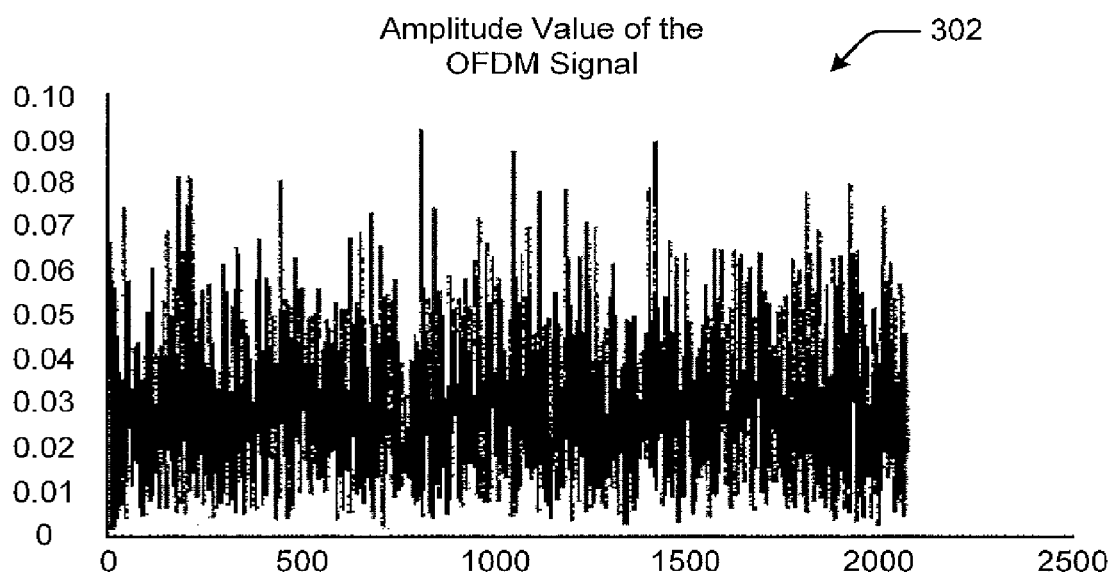
FIG. 3(B) is a graph illustrating an OFDM signal's amplitude value without amplitude attenuation.

FIG. 3(B) illustrates an OFDM signal's amplitude value without amplitude attenuation. As in FIG. 3(A), graph 302 is in time-domain. The samples are represented by the x-axis, and the amplitude value of the OFDM signal is represented in the y-axis. As in FIG. 3(A), the samples of the OFDM signal (graph 302) are represented as a Gaussian distribution and 2048 samples are taken.

Figure 3C:
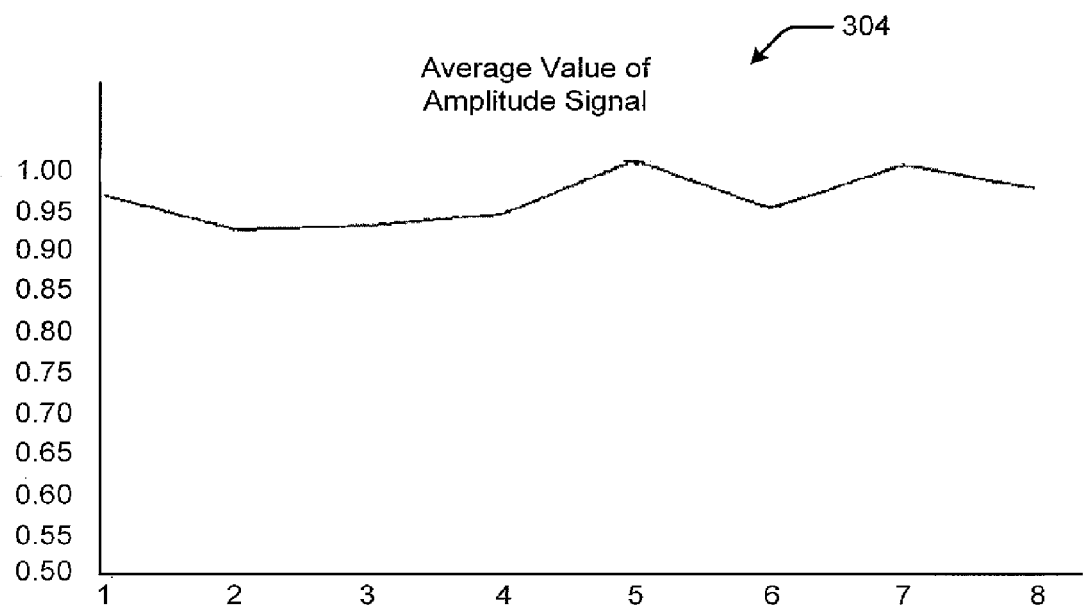
FIG. 3(C) is a graph illustrating an averaging of amplitudes of OFDM signals.

FIG. 3(C) illustrates an averaging of the amplitudes of the OFDM signals. The 2048 samples in graph 302 of FIG. 3(C) are grouped into eight groups. The eight groups are represented by the x-axis of graph 304. Averaged amplitude values are represented by the y-axis of graph 304. Since the normalized (i.e., averaged) values are approximately the same (i.e., constant), it can be assumed that the OFDM signal was not affected with amplitude distortion.

Figure 3D:
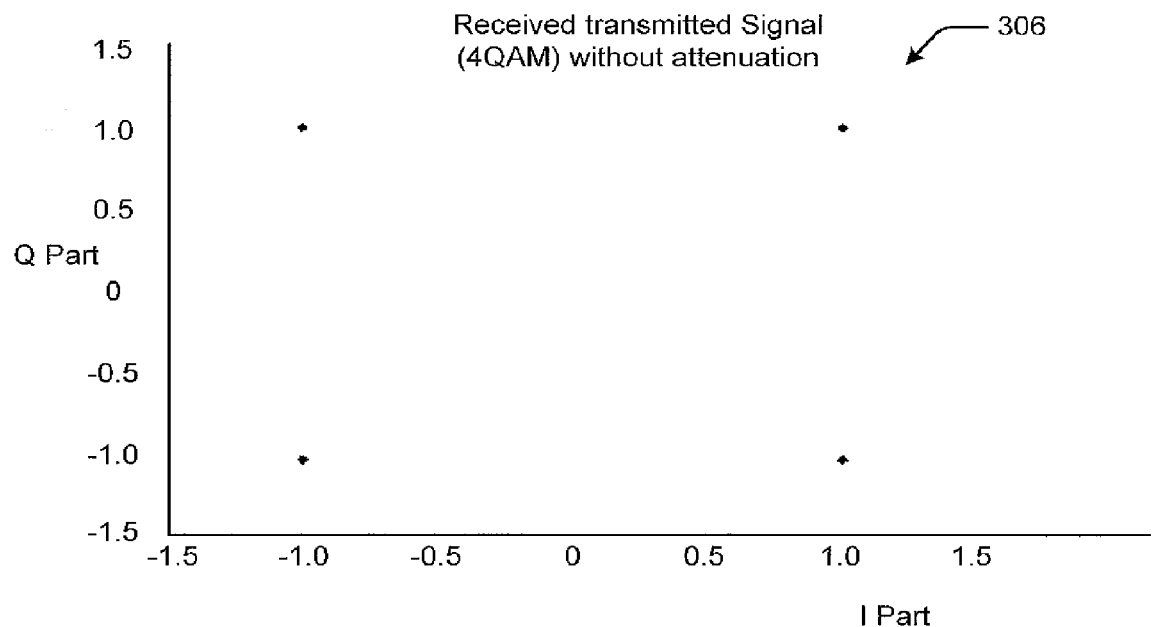
FIG. 3(D) is a graph illustrating the constellation of a recovered OFDM signal (sub-carrier modulation QPSK) by a receiver, without any amplitude distortion.

FIG. 3(D) illustrates a recovered OFDM signal. In particular, graph 306 illustrates the OFDM signal as represented in graphs 300, 302, and 304 as recovered or demodulated by a receiver such as mobile communication device 100. In this example, the transmitted signal is a 4-QAM signal. In graph 306, the x-axis represents real or I (in phase) part values of the signal, while the y-axis represents the imaginary Q (quadrature) part of the signal.

Figure 3E:
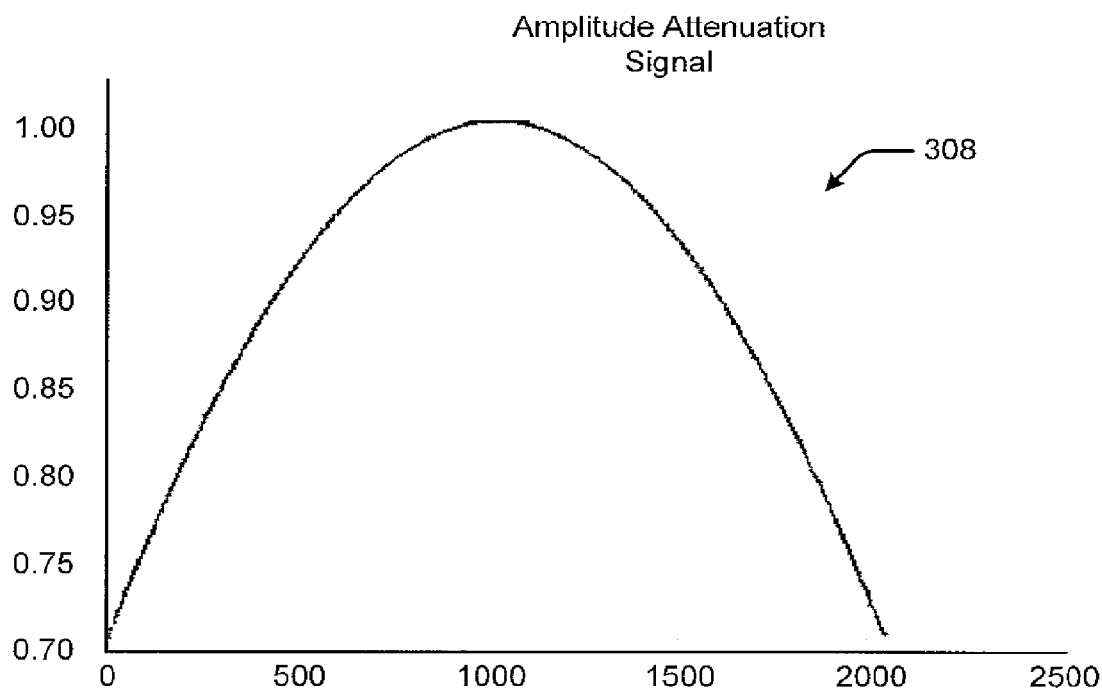
FIG. 3(E) is a graph illustrating the amplitude attenuation.

FIG. 3(E) illustrates the envelope of the amplitude attenuation. Amplitude values are represented by the y-axis of graph 308. Samples (2048 samples are graphed) are represented by the x-axis. The graph 308 shows a symmetric parabolic shape; however, this is to illustrate that the amplitude values of the OFDM signal vary with no constant (normalized) value as is seen in graph 304. In certain cases, amplitude distortion signal may have a lot of diversity as discussed later.

Figure 3F:
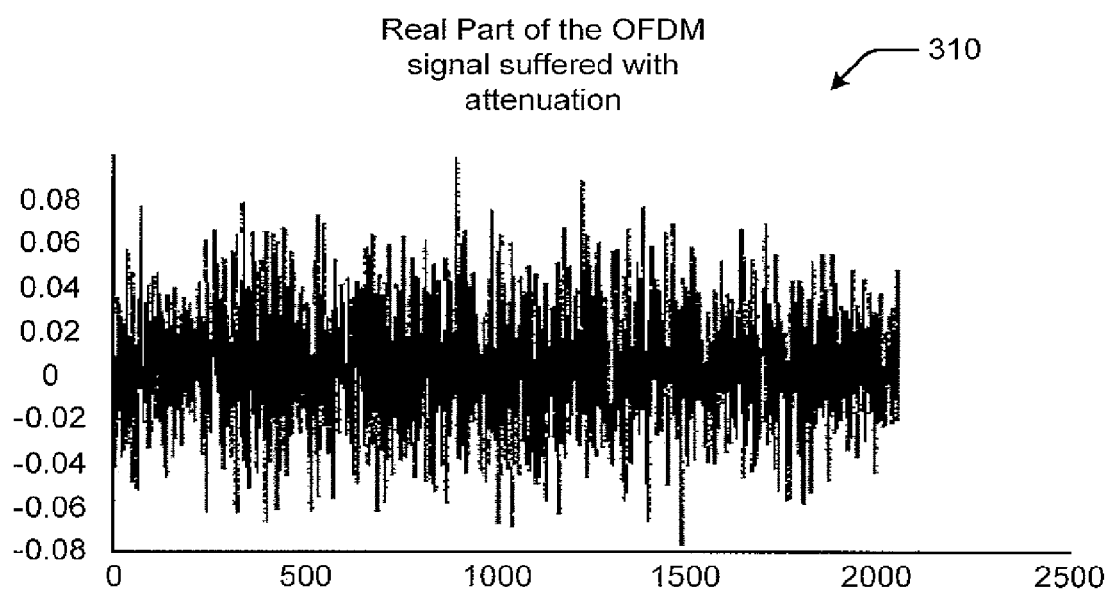
FIG. 3(F) is a graph illustrating a real part of an OFDM signal that includes amplitude attenuation.

FIG. 3(F) illustrates real part of an OFDM signal that includes amplitude attenuation. Graph 310 represents the signal in graph 308, with the x-axis representing the number of samples and the y-axis representing amplitude values.

Figure 3G:
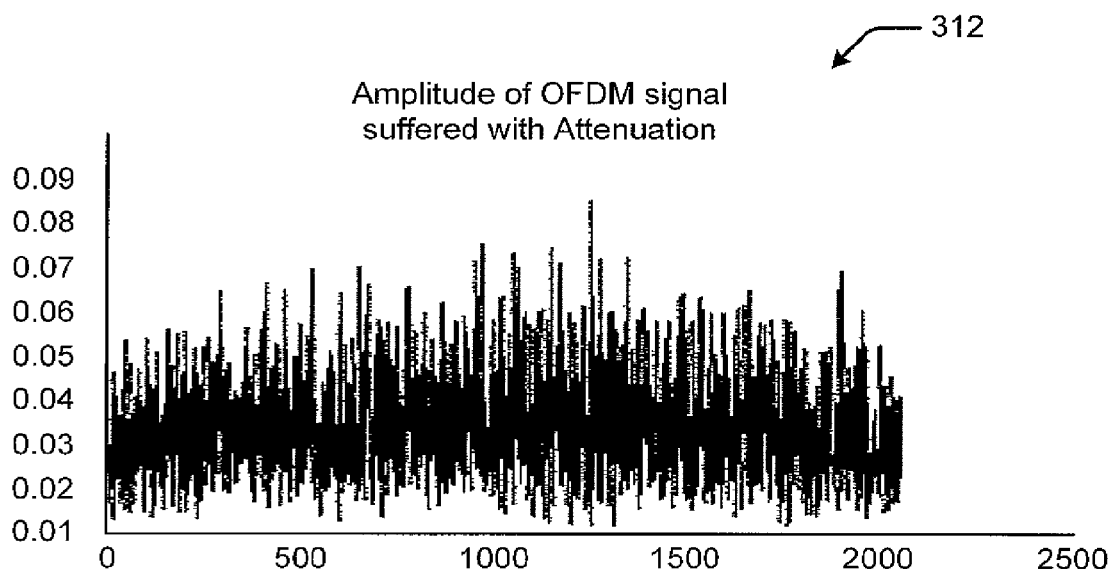
FIG. 3(G) is a graph illustrating an OFDM signal's amplitude value with amplitude attenuation in time domain.

FIG. 3(G) illustrates an OFDM signal's amplitude value with amplitude attenuation in time domain. The samples are represented by the x-axis, and the amplitude value of the OFDM signal is represented in the y-axis. Graphs 310 and 312 are represented and shown as Gaussian distribution, similar to graphs 300 and 302, graphs 310 and 312. At first glance, there is no obvious procedure to obtain the amplitude attenuation information, since the signal statistics has similar properties of a Gaussian signal of a signal without amplitude attenuation, such as the signal represented in graphs 300 and 302.

Figure 3H:
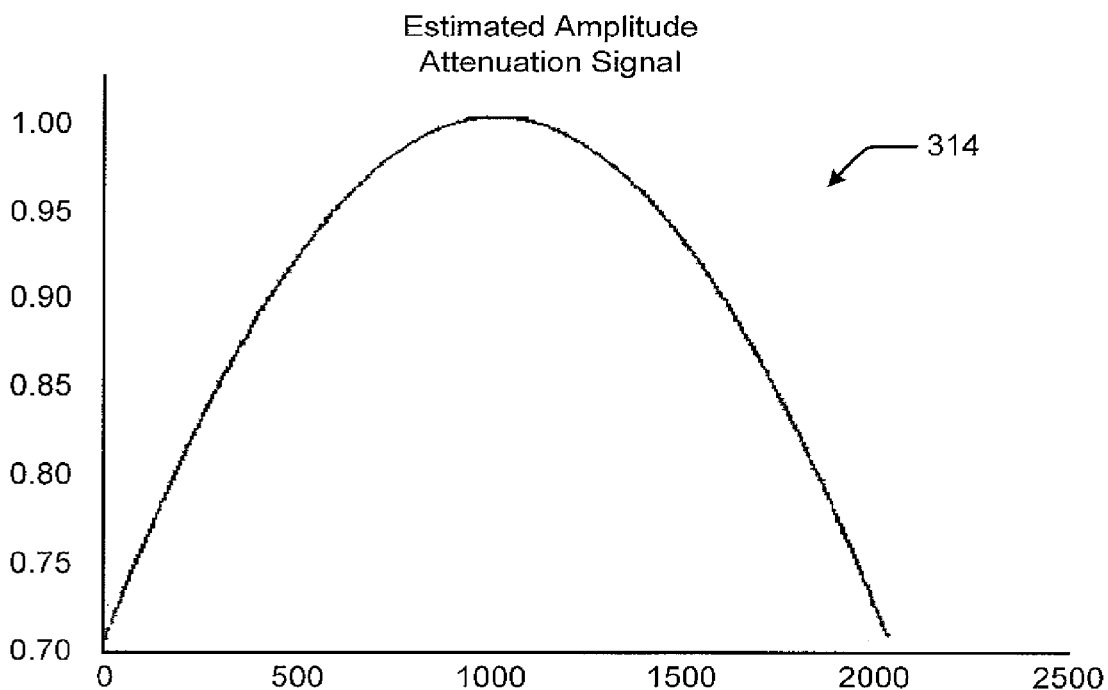
FIG. 3(H) is a graph illustrating an estimated amplitude attenuation signal

FIG. 3(H) illustrates an estimated amplitude attenuation signal. The graph 314 represents an amplitude attenuation signal created with estimation techniques that are described below. The graph 314 may be used in correcting an amplitude attenuated OFDM signal.

Figure 3I:
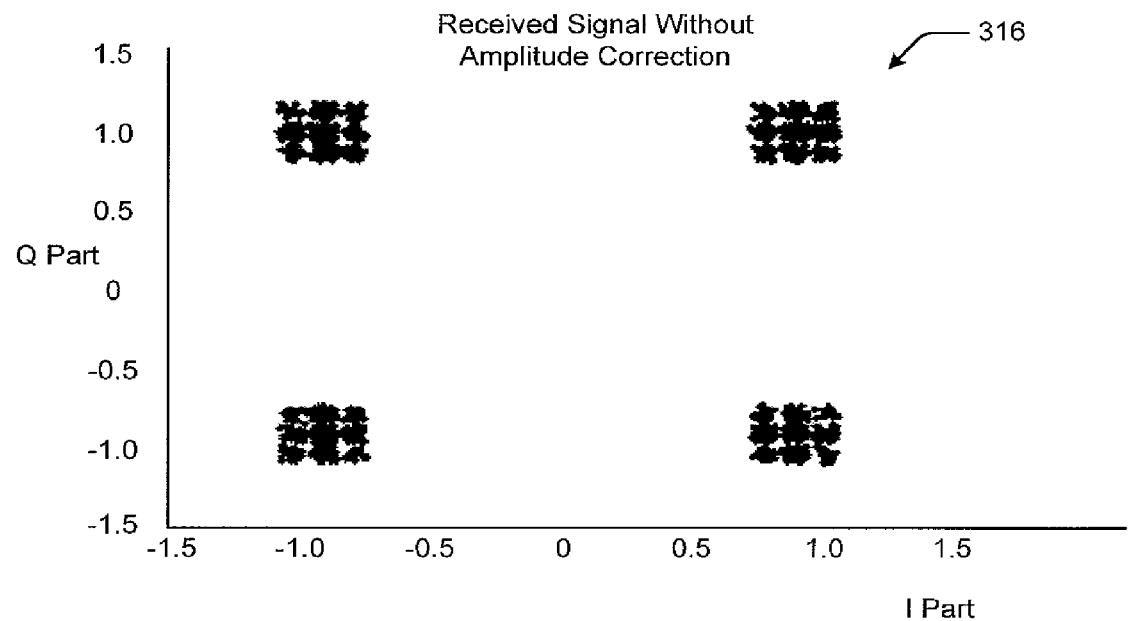
FIG. 3(I) is a graph illustrating an OFDM signal processed without any amplitude attenuation correction.

FIG. 3(I) illustrates an OFDM signal processed without any amplitude attenuation correction. A received or processed signal constellation as represented by graph 316 shows clear deterministic disturbance as represented by sub-constellations surrounding the actual true values. Graph 316 shows a 4-QAM signal.

Figure 3J:
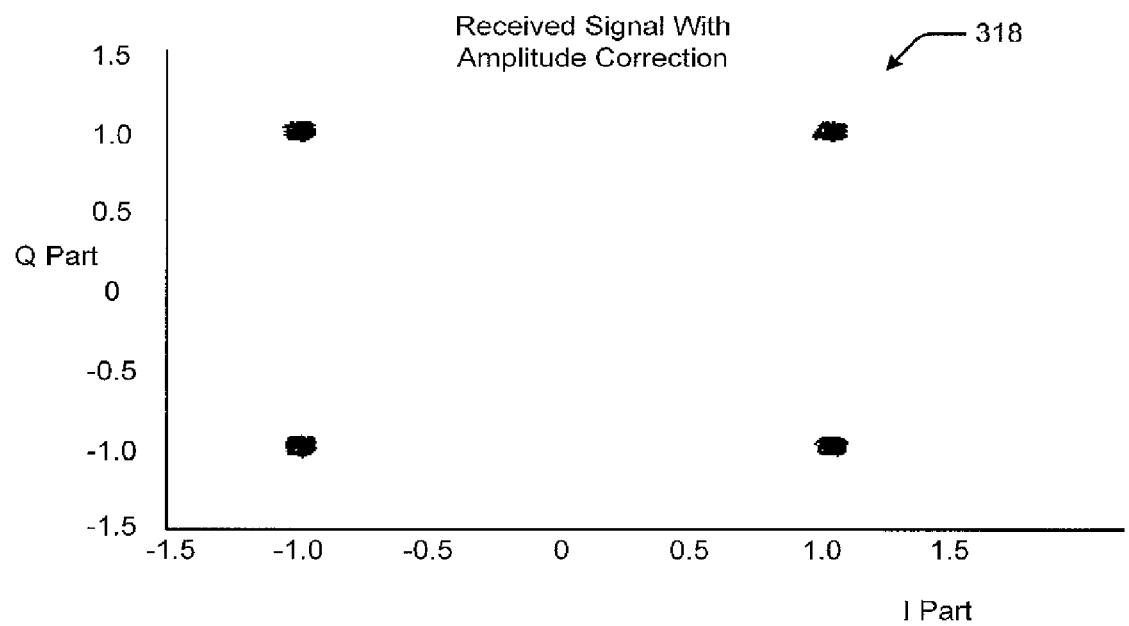
FIG. 3(J) is a graph illustrating a received OFDM signal (sub-carrier modulation QPSK) processed with amplitude attenuation correction.

FIG. 3(J) illustrates an OFDM signal processed with amplitude attenuation correction. Graph 318 shows a sharper data points as compared to graph 316. This is representative of a reduction in ICI. The constellation density in the examples is a 4-QAM signal. As constellation density is increased to 16-QAM, 64-QAM, etc, the ICI effect becomes more severe.

Exemplary Architecture

Figure 4:
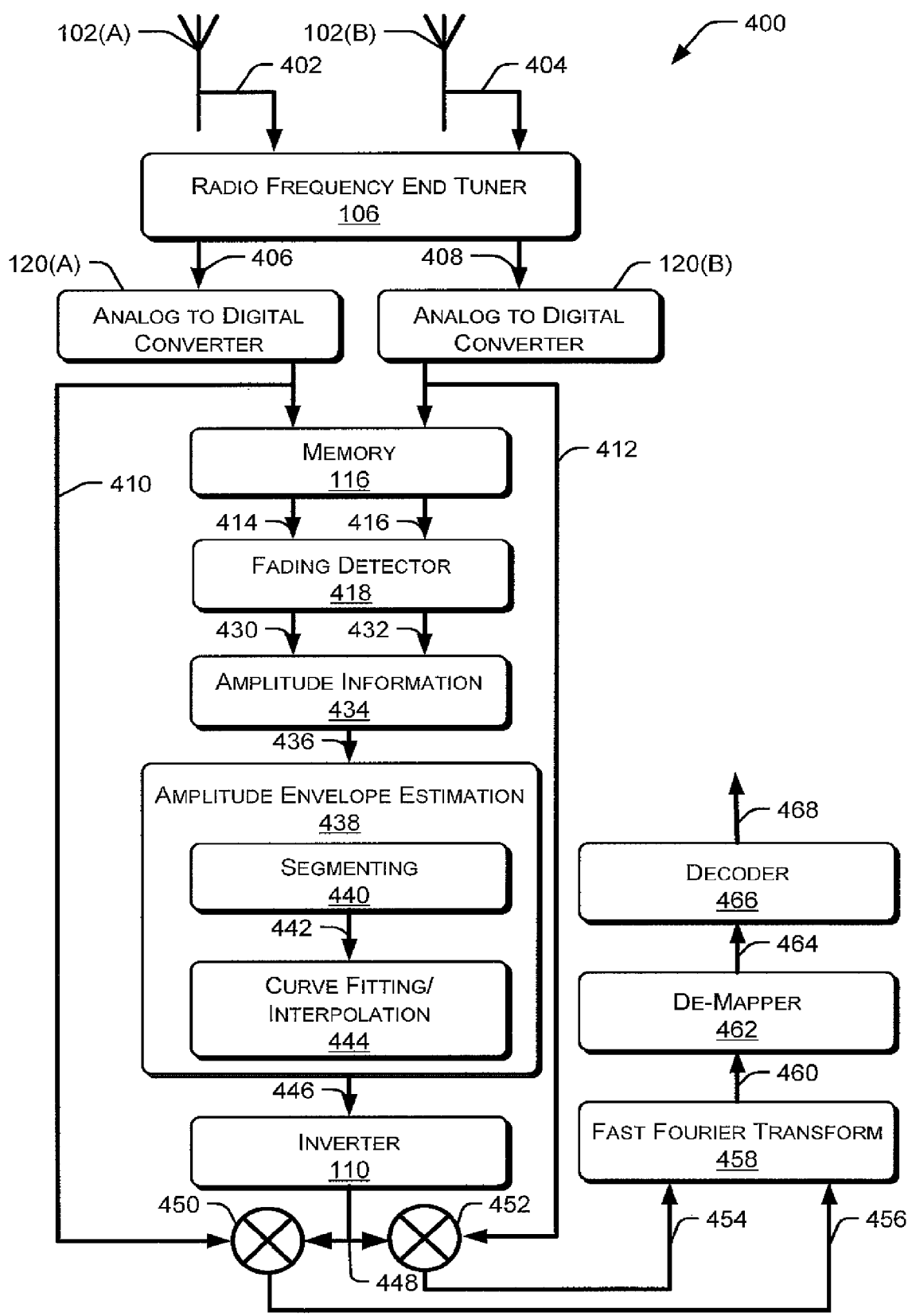
FIG. 4 is a block diagram illustrating a system architecture implementing amplitude attenuation correction of OFDM signals.

FIG. 4 illustrates a block diagram 400 of an exemplary architecture of a circuit implementing amplitude attenuation correction of OFDM signals. As discussed above, one or more antennae 102 are configured to receive RF signals, and in particular OFDM RF signals. In this example, antenna 102(A) may receive signals through a particular band (e.g., UHF, L-band, etc.), and antenna 102(B) may receive signals in a different band. It is to be understood that other antennas may also be implemented.

The radio frequency end tuner 106 is configured, or has inputs, to accept the received RF signals 402 and 404 from antenna 102(A) and antenna 102(B). The radio frequency end tuner 106 may also include other input to receive signals from other antennas and components. In certain implementations, the radio frequency front-end tuner 106 outputs a baseband signal or IF signals. In this example, two baseband signals 406 and 408 are output. Baseband signal 406 may be a real or in-phase (I) signal, and baseband signal 408 may be an imaginary or quadrature (Q) signal. Signals 406 and 408 are respectively received by an ADC 120(A) and ADC 120(B). The baseband I and Q signals 406 and 408 are sampled at sampling rate 1/T by ADC 120(A) and ADC 120(B), where T is an elementary period. In certain implementations, a single baseband signal may be provided by radio frequency end tuner 106, where the single baseband signal can be a low-IF or IF signal with only an I component. The OFDM signal is sampled symbol by symbol. In a DVB-T/H digital TV system, for a 2K system, 2048 samples are obtained (i.e., N=2048); for a 4K system, 4096 samples are obtained (i.e., 4096 samples); and for an 8 k system, 8192 samples are obtained (i.e., 8192 samples).

The analog baseband signals 406 and 408 are converted to digital baseband signals 410 and 412. The digital baseband signal 410 may be represented as $s_I(n)$ as an in-phase or I digital signal, and digital baseband signal 412 may be represented as $s_Q(n)$ as a quadrature or Q digital signal.

The memory 116 may be used to store signal values or samples. For example, for a 2K system, 2048 signal samples of $s_I(n)$ and $s_Q(n)$ may be stored in memory 116. For a 4K system, 4096 signal samples may be stored; and for an 8K system, 8192 samples may be stored.

The digital baseband signals $s_I(n)$ 414 and $s_Q(n)$ 416 may be passed on to a fading detector 418. The fading detector 418 can use an autocorrelation function to detect fading for an OFDM signal. As discussed above, a determination may be made as to whether distortion is based on one-signal distortion or multi-signal distortion.

Figure 4A:
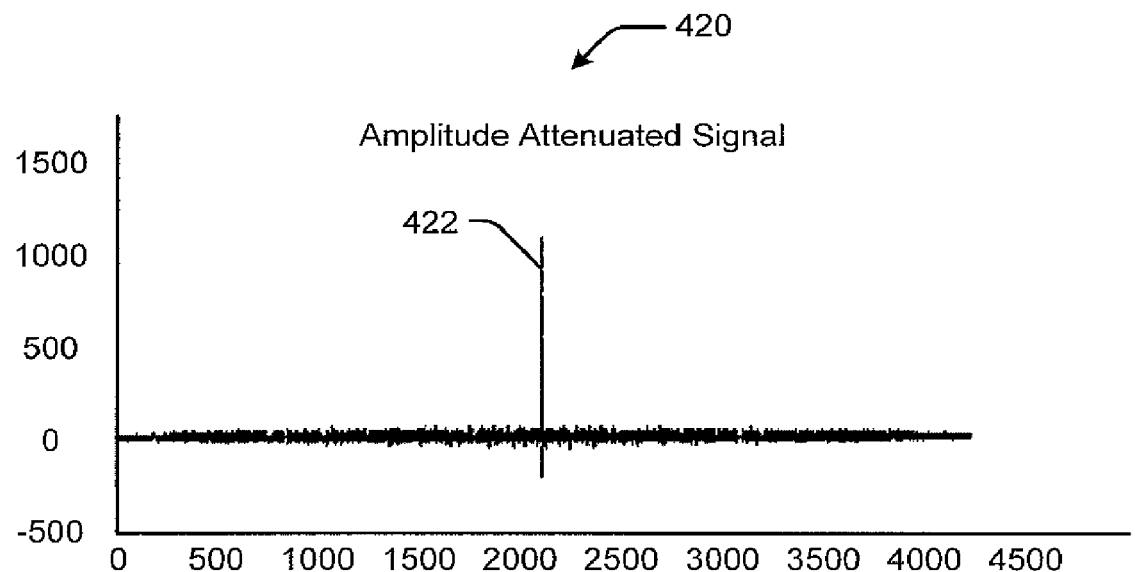
FIG. 4(A) is a graph illustrating auto-correlation of one-signal distortion.
Figure 4B:
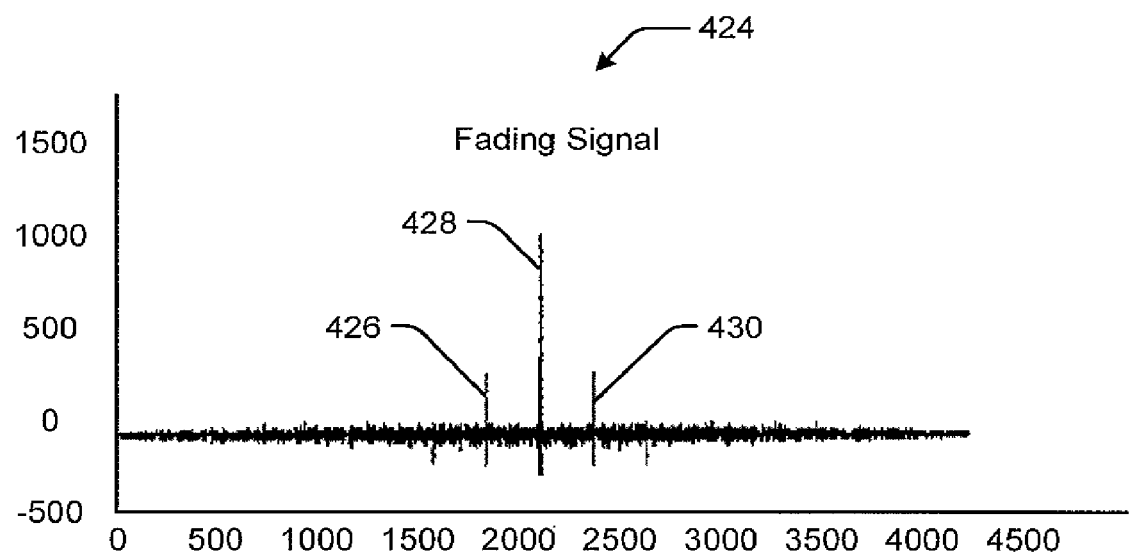
FIG. 4(B) is a graph illustrating autocorrelation of an OFDM signal affected by fading.

Referring now to FIG. 4(A) which illustrates a graph 420 representing auto-correlation of one-signal distortion. If the OFDM signal is affected only with amplitude attenuation and not transmitted through multi-path communication channel (i.e., one-signal distortion), its autocorrelation sequence has only one non-zero value at zero-lag as shown at 422. FIG. 4(B) illustrates a graph 424 of autocorrelation of an OFDM signal affected by fading, non-zero values of the autocorrelation sequence occurs in several points 426, 428 and 430. Depending on whether the distortion is one-signal or multi-signal, particular amplitude attenuation systems or methods may be implemented. Such methods include 1) time-domain estimator, 2) frequency-domain estimator, 3) signal envelop detector, and 4) deterministic information (i.e., finite alphabet property) estimator.

Digital baseband signals $s_I(n)$ 430 and $s_Q(n)$ 432 are passed to an amplitude information module 434 that calculates the amplitude value; The amplitude information module 434 may be expressed by the following equation:

$$s(n) = \sqrt{s_I^2(n) + s_Q^2(n)}$$

Leading to the signal 436, which is the amplitude value of the OFDM symbol.

The amplitude of the OFDM symbol 436 is processed. by amplitude envelope estimation module 438 in order to extract the amplitude distortion envelope. As an example, the amplitude signal may have similar shape as shown in FIG. 3(H). Techniques for the amplitude attenuation estimation can be realized in several ways. For example, amplitude attenuation estimation in amplitude envelope estimation module 438 can use different moving windowing techniques, different interpolation techniques, different low-pass filter techniques, and/ or different curve-fitting techniques, to estimate whole attenuation values. An implementation for module 438 includes "sliding averaging" where module 438 includes consisting of modules 440 and 444. The samples represented by signal 436 are sent to a segmenting module 440. At the segmenting module 440, the obtained samples of signal 436 are segmented into τ groups, each with $N_1$ samples ($N_1 = N/\tau$). In segmenting module 440, τ point values are obtained from averaging $N_1$ samples as represented by the following equation:

$$\frac{1}{N_1} \sum_{n=1}^{N_i} s(n + (\tau - 1) * N_i)$$

In an implementation, a technique is to use a slide-moving window, where each window has $N_1$ samples. The overlap size of two close windows is variable; however, more average results are obtained with more computational-time. In summary, the averaged results are treated as attenuation values.

Using the obtained τ points as represented by 442, interpolation techniques are employed at a curve fitting/interpolation module 444. In particularly, a curve is fitted or interpolated to account for the number of samples in the original signals 410 and 412. In specific, the curve is fitted or interpolated to account for attenuation values corresponding to each one of the samples in a 2K system (i.e., 2048 samples), in a 4K system (i.e., 4096 samples), or 8K system (i.e., 8192 samples). Module 444 may use various curve-fitting methods known in the art may to estimate the amplitude attenuation curve. The curve may further be sampled by 1/T to obtain amplitude attenuation values corresponding to each sample. Module 444 outputs estimated attenuation information as represented by signal 446.

The signal 446 is passed on to the inverter 110. The original baseband signals 406 and 408 from radio frequency end tuner 106 are multiplied in time domain with the obtained inverse attenuation envelop signal 448 at multiplier 450 and multiplier 452, where each sample of the original OFDM signal is multiplied by the corresponding inverse attenuation. A corrected signal 454 is representing a quadrature value is output from the multiplier 452, and a corrected signal 456 representing an in-phase value is output from multiplier 450.

In an implementation, the attenuation estimation module 108 can include the memory 116, fading detector 418, segmenting module 440, and the curve fitting/interpolation module 444.

Signals 454 and 456 may be processed by methods known in the art to derive communication signal information. In this example, signals 454 and 456 are passed to a Fast Fourier Transform module 458 which may include an algorithm to derive a discrete Fourier transform and an inverse. The output signal 460 may be passed on to a De-Mapper 462. The de-mapped signal 464 may be sent to decoder 466 which provides a signal 468 which may be used by the device implementing architecture 400.

Correct Amplitude Attenuation in Frequency Domain

Figure 5:
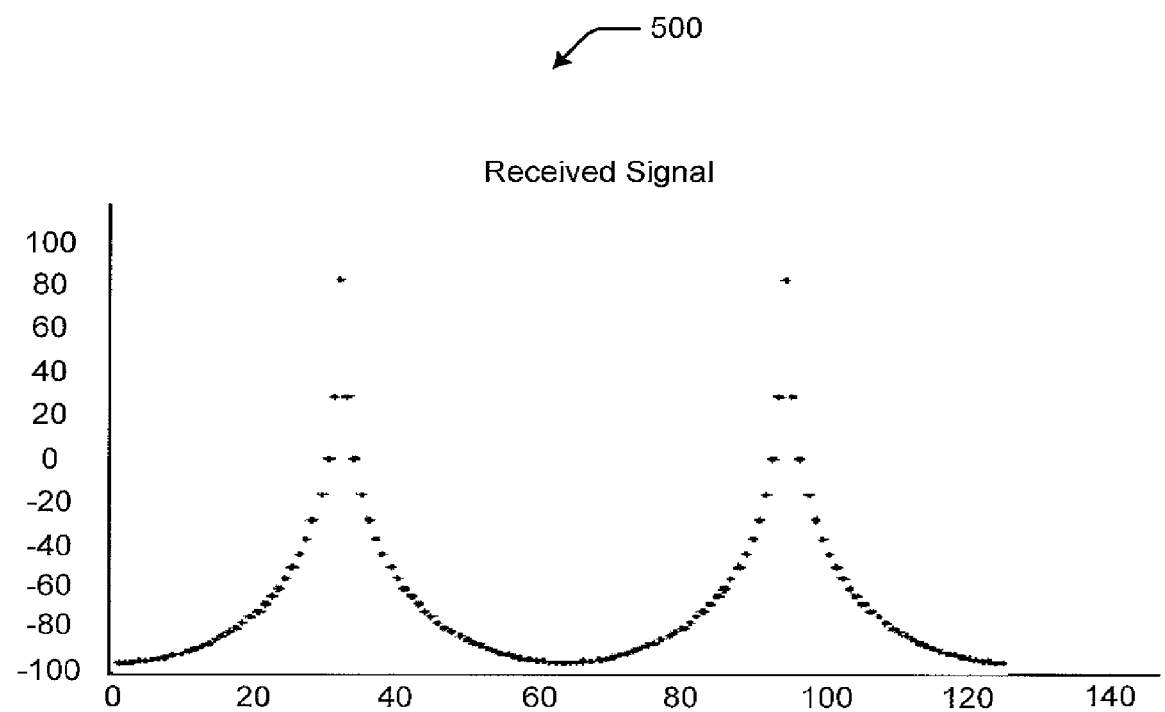
FIG. 5 is a graph illustrating a received OFDM signal with one main frequency component and many adjacent components of neighbor carriers.

FIG. 5 illustrates a received OFDM signal with one main frequency component and many adjacent components of neighbor carriers. In RF communications, a received communication signal may be represented as a discrete Fourier transform or a DFT. A DFT filter-bank may be implemented by a device. For perfect OFDM reception, a DFT filter-bank would have has no leakage, and one main frequency component per carrier is obtained. In cases of amplitude distortions, the DFT filter-bank may leak.

Graph 500 shows that amplitude and phase of all the components are 100% correlated to each other, leading to a deterministic disturbance in form of sub-constellations shown in FIG. 3(1). The main component is still the biggest. The next highest are the left and right adjacent carrier components, all other components are about 30 dB lower than these two. Thus, it is noted that the amplitude attenuation can be corrected in frequency domain by estimating the main vector component and the error vector components of at least its two adjacent points and apply the correction for the adjacent carriers. This procedure may be performed for all the carriers of the OFDM signal.

Correct Amplitude Attenuation by Using Signal Envelope Detector

Figure 6:
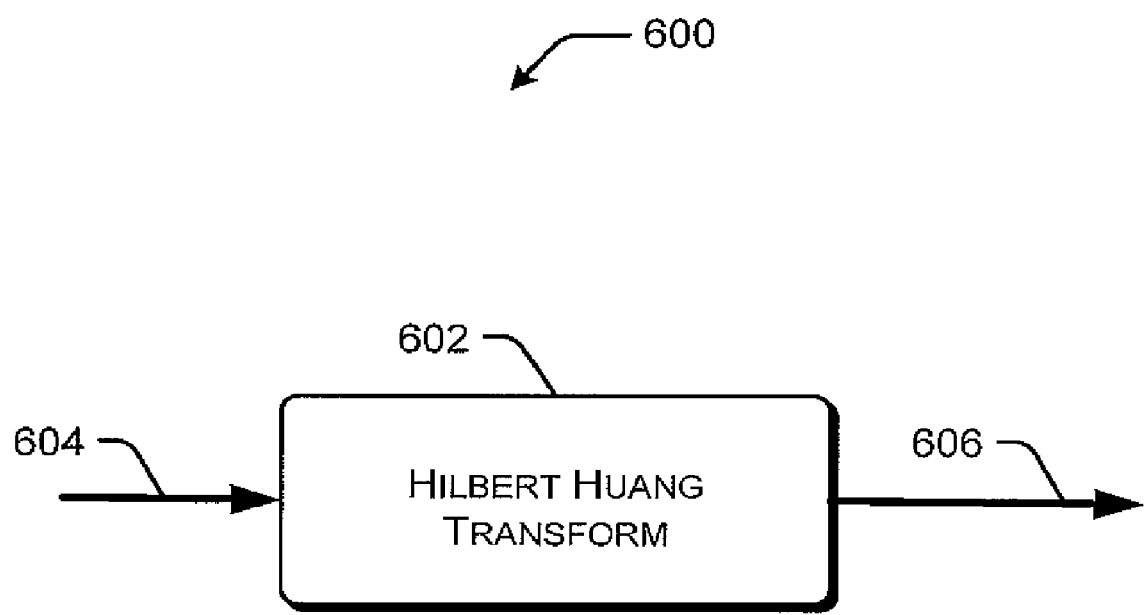
FIG. 6 is a block diagram illustrating a Hilbert-Huang Transform module that receives an OFDM symbol and outputs an envelop signal.

FIG. 6 illustrates a block diagram 600 of an HHT module 602 receiving an OFDM symbol 604 and outputting an envelop signal 606. The amplitude attenuation signal is considered as a signal envelop (e.g., obtained inverse attenuation envelop signal 446) of the received RF communication signal. As known those skilled in the art, Hilbert transform can be used to obtain the signal envelop. If the transmitted signal is a pure cosine or sine signal, estimation result has high precision, as represented by the following equation, where ⊗denotes convolution.

$$y(t) = S(t) + j\frac{1}{\pi t} \otimes S(t)$$

Because, an OFDM signal may be considered as a summation of cosine signals, a Hilbert transform can not be directly used to obtain envelop information. It is contemplated that the known Hilbert-Huang transform (HHT), can be adopted as an amplitude envelope detector for this kind of signal. For example, HHT supposes the under-estimation signal is composed by several intrinsic mode signal or intrinsic mode function. Since an OFDM symbol is composed of a couple of cosine signals, by using empirical mode decomposition as taught by HHT, the envelop signal is available to be extracted from an OFDM symbol.

In particular, the OFDM symbol 604 may be in the form of a baseband, low IF, or IF signal represented by s(t), and the envelope signal 606 may be represented by an amplitude signal a(t). In certain implementations, the block diagram 600 or HHT module 602 may replace the amplitude envelope estimation module 438.

Attenuation Correction after FFT

Figure 7:
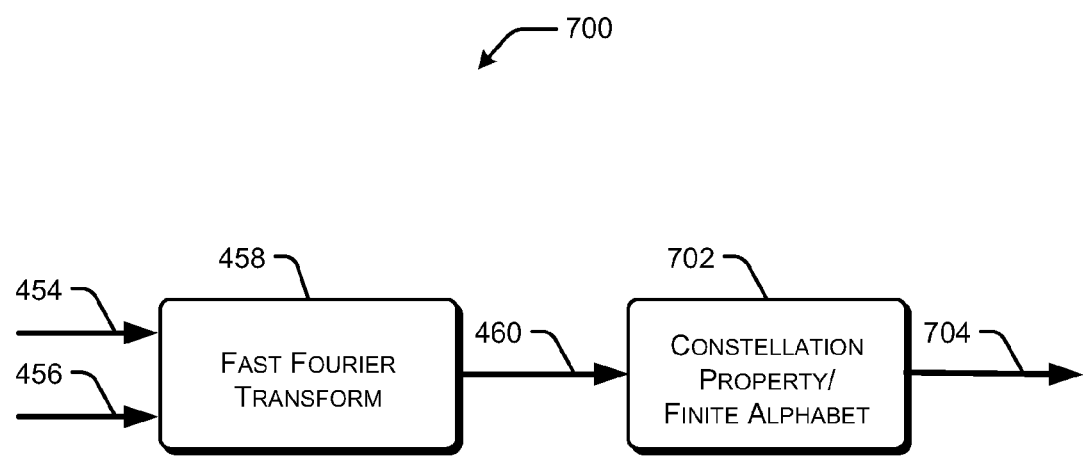
FIG. 7 is a block diagram illustrating a constellation property/finite alphabet module to address sub-constellation information.

FIG. 7 illustrates a block diagram 700 that includes a constellation property/finite alphabet module 702. As shown in FIG. 3(I), ICI effect is deterministic. In other words, the sub-constellation information around the main constellation is known at the receiver. Therefore, the sub-constellations in a signal constellation diagram can be corrected. In an OFDM communication system, the constellation information, also referred to as finite alphabet (FA) property, of the transmitted signal, is transmitted in TPS pilots. As known in the art, in DVB, in order to simplify the reception of a signal being transmitted on the terrestrial radio channel, additional signals are inserted in each block. Pilot signals are used during synchronization and equalization phase. Transmission parameters signaling TPS signals are used to send the parameters of the transmitted signal and to identify a transmission cell. A device or receiver synchronizes, equalizes and decodes the signal to gain access to the information held by TPS pilots. The receiver knows this information beforehand through the TPS pilots. Therefore, the constellation information is available at the receiver if the OFDM signal may be demodulated correctly.

The module 702 further receives the output signal 460 from the Fast Fourier Transform module 458 described above, and further processes the signal 460 based on the constellation information or FA property to reduce ICI effect.

In cases implementing a multi path channel, a moving user (i.e., receiver) may receive a signal that is suffered with fading and Doppler spreading. As discussed, the received signals may also have effects like amplitude attenuation; however in regards to the ICI cancellation property, the discussed methods and systems can be used to correct part of the degradations caused by Doppler effects.

Pure Amplitude Change Due to Amplifier in RF or Baseband Stage

Figure 8:
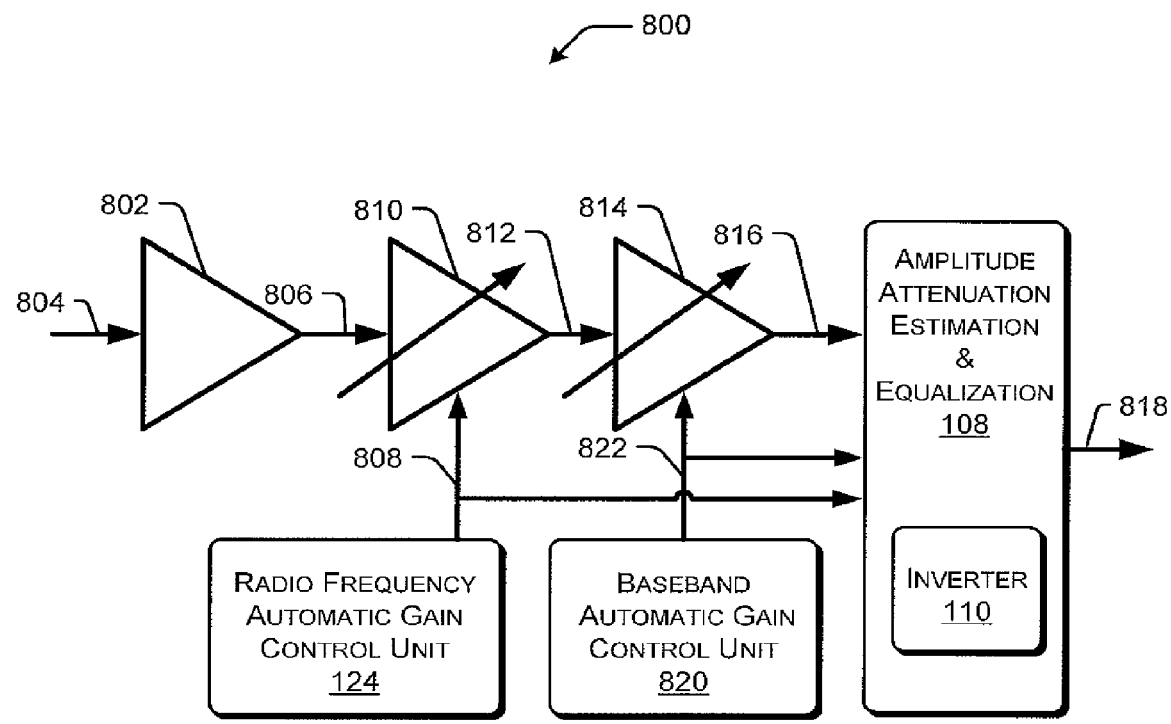
FIG. 8 is block diagram illustrating an architecture to address implementations where estimation of amplitude distortion is known a priori.

FIG. 8 illustrates a block diagram 800 that addresses implementations for which estimation of amplitude distortion is known a priori. An estimation of the amplitude distortion may be known a priori, because the amplitude distortion may be part of the system. For example, an RF amplifier 802 may cause amplitude attenuation, where the RF amplifier 802 receives a signal s(n) 804 and passes a signal 806. The RF AGC unit 124 provides signal c(t) 808 to control the gain of the RF amplifier 802. The control signal c(t) 808 can be recorded by some apparatus 810, and its reciprocal 1/c(t) can be used in baseband for amplitude correction, where the reciprocal 1/c(t) may be passed in a signal 812 to an apparatus 814 that records the reciprocal and passes the signal s(n) 804, the control signal c(t) 808, and the reciprocal 1/c(t) as a signal or signals 816. Signal 816 may include I and Q signals and/or an IF signal. The signal 816 is received by the amplitude attenuation and equalization unit 108, which includes the inverter 110. The amplitude attenuation and equalization unit 108 provides a signal 818 which is similar to the above described signals 452 and 454.

An implementation may also be performed for a baseband AGC unit 820 which uses a step control signal b(n) 822. The baseband AGC unit 820 can be implemented as I/Q-output or IF signal output.

Phase/Time Offset Correction

While estimating amplitude distortion function, which can be continuous or stepped, a phase or time offset may be obtained. The phase or time shift can happen in the estimated attenuation signal represented by $\hat{a}(n)=a(n)e^{j2\pi\phi}$ or $\hat{a}(n)=a(n-\Delta T)$, where $\phi$ (phase) or $\Delta T$ (period change) is caused by a phase/time shift. Therefore, in this implementation, phase/time shift offset should be considered.

Exemplary Process

Figure 9:
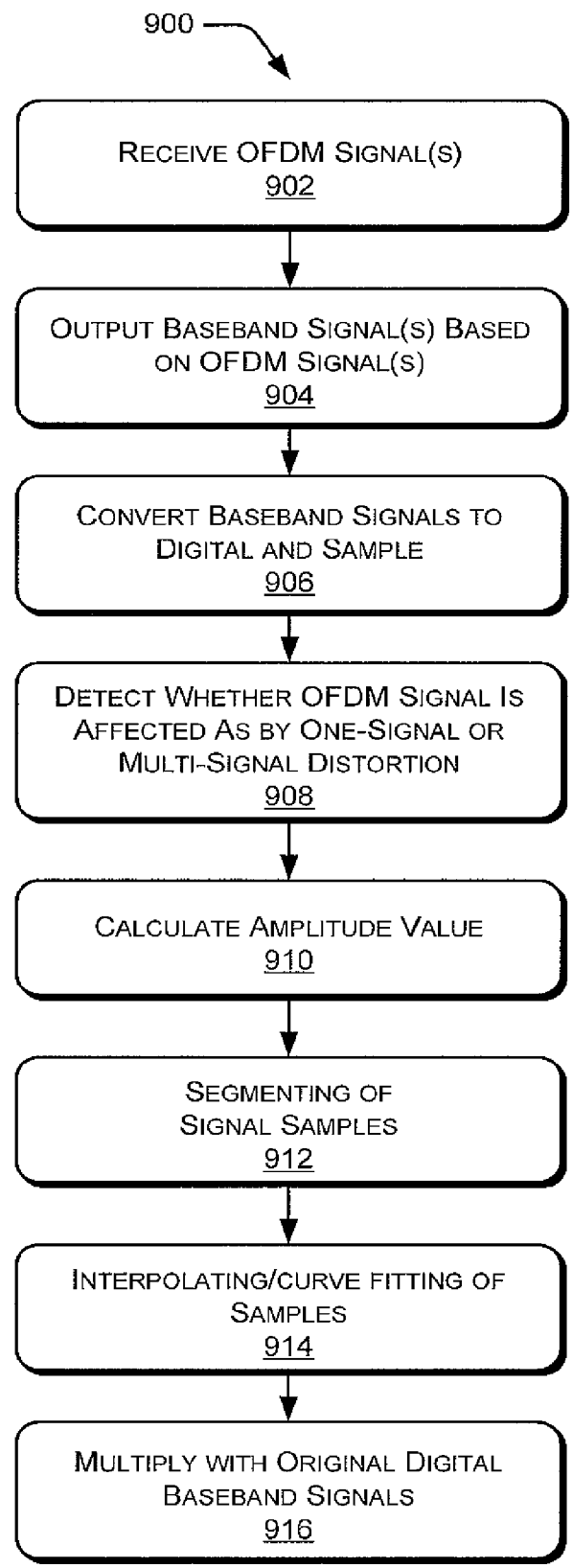
FIG. 9 is a flow diagram for a process for correcting amplitude attenuation effects in orthogonal frequency division multiplexing or OFDM signals.

FIG. 9 shows one example implementation of a process 900 for correcting amplitude attenuation effects in orthogonal frequency division multiplexing or OFDM signals of communication devices. Specifics of exemplary methods are described below. However, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable media. The computer-readable media can be any available media that can be accessed by a computing device to implement the instructions stored thereon.

At 902, an OFDM signal or signals are received in the form of a RF signal. The received signals include data or information and may or may not include some error such as inter-carrier interference (ICI). In particular, there may be some amplitude attenuation in the received signal causing the ICI. The RF signal may be received by one or more antennae, such as antennae 102(A) and 102(B).

At 904, a baseband signal or signals are output based on the received OFDM signal or signals. In certain implementations, there may two baseband signals, where one baseband signal is a real or in-phase (I) signal, and the other baseband signal is an imaginary or quadrature (Q) signal. For single baseband signals, the signal may be a low intermediate frequency (IF) signal or an IF signal with only an in-phase or I component.

At block 906, the analog baseband signal is converted to digital, and the digital OFDM signal is sampled symbol by symbol at an elementary period "T". As discussed above, as an in a DVB-T/H digital TV system, for a 2K system, 2048 samples are obtained (i.e., N=2048); for a 4K system, 4096 samples are obtained (i.e., 4096 samples); and for an 8 k system, 8192 samples are obtained (i.e., 8192 samples).

At block 908, detection or determination is made as to whether the OFDM signal(s) is affected by one signal or multi-signal distortion. As discussed above, the detection or determination may be performed by a fading detector. Depending on whether the distortion is one-signal or multi-signal, particular amplitude attenuation systems or methods may be implemented. Such methods include 1) time-domain estimator, 2) frequency-domain estimator, 3) signal envelop detector, and 4) deterministic information (i.e., finite alphabet property) estimator.

At block 910, a calculation is performed as to amplitude value. As discussed above, methods used in time-domain amplitude attenuation estimation can be realized in several ways. For example, averaging may be implemented that includes the use of different moving windowing techniques, different interpolation techniques, different low-pass filter techniques, and/or different curve-fitting techniques, to estimate whole attenuation values.

At block 912, segmenting is performed on the samples of the amplitude values. The samples of signal are segmented into groups, each group having a number of sample samples. As discussed above, τ group number point values are obtained from averaging $N_1$ samples as represented by the following equation:

$$\frac{1}{N_1}\sum_{n=1}^{N_i} s(n + (\tau - 1) * N_i)$$

In an implementation, a slide-moving window may be used, where each window has $N_1$ samples. The overlap size of two close windows is variable; however, more average results are obtained with more computational-time. The averaged results are treated as attenuation values.

At block 914, interpolating of the sample is performed. This may also referred to as curve fitting. As discussed above, a curve is fitted or interpolated to account for the number of samples in the original baseband signals. The curve is fitted or interpolated to account for attenuation values corresponding to each one of the samples in a 2K system (i.e., 2048 samples), in a 4K system (i.e., 4096 samples), or 8K system (i.e., 8192 samples). Various curve-fitting methods known in the art may be used to estimate the amplitude attenuation curve. Furthermore, the curve may further be sampled by 1/T to obtain amplitude attenuation values corresponding to each sample. In addition, the values of the interpolated samples may be inverted.

At block 916, the samples of from the interpolated curve are multiplied with the original baseband signals. The multiplication is performed with a one to one correspondence with the samples of the original OFDM signal and corresponding inverse attenuation, in time domain.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. For example, the systems described could be configured as wireless communication devices, receivers, attenuation correction circuits, and control loops. In addition, the signals with behavior such as orthogonal frequency division multiplexing or OFDM may also apply.

What is claimed is:

1. An apparatus comprising:
   one or more antennae configured to receive an OFDM signal;
   a radio frequency end tuner to receive the OFDM signal from the antennae;
   an amplitude attenuation estimation module that performs amplitude correction on the received OFDM signals; and
   a DFT filter bank, wherein the amplitude correction is corrected in frequency domain by estimating a main vector component and error vector components of at least two adjacent points of the main vector component and applying the correction for adjacent carriers in order to avoid leakage in the DFT filter bank.

2. The apparatus of claim 1, wherein the amplitude attenuation estimation module comprises a detector to determine if the amplitude correction is based on one signal distortion or multi-signal distortion.

3. The apparatus of claim 1, wherein the amplitude attenuation estimation module comprises a Hilbert-Huang Transform (HHT) module.

4. The apparatus of claim 1 further comprising an automatic gain control unit, wherein the amplitude attenuation estimation module corrects amplitude attenuation contributed by the automatic gain control unit.

5. In a device receiving OFDM signals, the device comprising:
   a circuit comprised of:
   a radio frequency end tuner that outputs one or more baseband signals, wherein the signals are comprised of samples;
   a memory to store the samples;
   an amplitude information module that calculates estimated amplitude distortion for the samples;
   a segmenting module that segments the samples into groups, wherein the groups are averaged;
   a curve fitting module that interpolates the averaged samples, to account for the number of samples in the original baseband signals;
   an inverter that inverses the samples from the curve fitting module; and
   one or more multipliers that multiply samples from the one or more baseband signals with samples from the curve fitting module.

6. The device of claim 5, wherein the radio frequency end tuner provides a baseband signal with an in-phase component, and a baseband signal with a quadrature component.

7. The device of claim 5, wherein the amplitude information module implements one of the following: time-domain estimator, frequency-domain estimator, signal envelope detector, or deterministic information.

8. The device of claim 5, wherein the segmenting module implements a sliding window, wherein each window includes a number of samples.

9. The device of claim 5, wherein the curve fitting module accounts for samples for one of the following systems: a 2K system, a 4K system, or an 8K system.

10. The device of claim 5, wherein the samples are one of the following: a 2K system, a 4K system, or an 8K system.

11. The device of claim 5 further comprising a fading detector to determine whether the signals are based on one-signal distortion or multi-signal distortion.

12. The device of claim 5 further comprising a Fast Fourier Transform module that receives signals from the multipliers, and a property/finite alphabet module that receives output signal from the Fast Fourier Transform module, and processes the signal based on the constellation information or FA property.

13. A method comprising:
   receiving an OFDM signal in the form of a transmitted RF signal;
   outputting one or more baseband signals based on the received OFDM signal;
   converting the one or more baseband signals to digital signals comprised of samples;
   calculating amplitude values of the digital signals;
   obtaining an envelope of amplitude distortion based on the amplitude values;
   multiplying inverses of samples of the envelope of amplitude distortion with the received OFDM signal to produce corrected signals;
   determining whether to implement amplitude correction based on a threshold in a fading estimator and in an amplitude envelope estimator;
   providing the corrected signals to a Fast Fourier Transform module to derive a discrete Fourier transform and an inverse; and
   processing an output signal from the Fast Fourier Transform module based on constellation information of the OFDM signal.

14. The method of claim 13, wherein the method is implemented for Doppler compensation in regards to inter carrier interference cancellation.

15. The method of claim 13, wherein the obtaining of an envelope of amplitude distortion is known a priori.

16. The method of claim 15, wherein the method is performed for at least one of the following: an RF amplifier; an IF amplifier; and a baseband AGC unit.

17. The method of claim 13 further comprising considering phase/time offset in the obtaining the envelope of amplitude distortion.

* * * * *